(12) United States Patent
Jilani

(10) Patent No.: US 11,228,044 B2
(45) Date of Patent: Jan. 18, 2022

(54) BIPOLAR PLATE HAVING ASYMMETRICAL SEALING SECTIONS, AND FUEL CELL STACK HAVING SUCH A BIPOLAR PLATE

(71) Applicants: AUDI AG, Ingolstadt (DE); Volkswagen AG, Wolfsburg (DE)

(72) Inventor: Adel Jilani, Burnaby (CA)

(73) Assignees: Volkswagen AG, Wolfsburg (DE); Audi AG, Ingolstadt (DE)

( * ) Notice: Subject to any disclaimer, the term of this patent is extended or adjusted under 35 U.S.C. 154(b) by 56 days.

(21) Appl. No.: 16/077,002

(22) PCT Filed: Feb. 1, 2017

(86) PCT No.: PCT/EP2017/052181
§ 371 (c)(1),
(2) Date: Aug. 9, 2018

(87) PCT Pub. No.: WO2017/137292
PCT Pub. Date: Aug. 17, 2017

(65) Prior Publication Data
US 2019/0036130 A1    Jan. 31, 2019

(30) Foreign Application Priority Data
Feb. 10, 2016   (DE) ............ 10 2016 202 010.2

(51) Int. Cl.
*H01M 8/0247* (2016.01)
*H01M 8/0258* (2016.01)
(Continued)

(52) U.S. Cl.
CPC ....... *H01M 8/0247* (2013.01); *H01M 8/0258* (2013.01); *H01M 8/0273* (2013.01); *H01M 8/0297* (2013.01)

(58) Field of Classification Search
CPC ............. H01M 8/0247; H01M 8/0258; H01M 8/0202; H01M 8/0273; H01M 8/0297; Y02E 60/50
(Continued)

(56) References Cited

U.S. PATENT DOCUMENTS 4,588,661 A * 5/1986 Kaufman ............ H01M 8/0271
429/510
6,231,053 B1   5/2001 Wakamatsu
(Continued)

FOREIGN PATENT DOCUMENTS

CN        1549358 A     11/2004
CN      101079496 A     11/2007
(Continued)

OTHER PUBLICATIONS

English Translation of Farrington, WO2010-030654.*

*Primary Examiner* — Niki Bakhtiari
(74) *Attorney, Agent, or Firm* — Seed IP Law Group LLP

(57) ABSTRACT

The invention relates to a bipolar plate (15) for a fuel cell stack (10) comprising a first sealing section (157) on its side (151) as well as a second sealing section (158) on its second side. The sealing sections are designed to sealingly interact in a fuel cell stack (10) with an elastic seal element (16). It is provided that the first and second sealing sections of the bipolar plate (15) are designed asymmetrically in that at least one sealing projection (1571) is formed in the first sealing section (157), and the second sealing section (158) is formed without a sealing projection and/or is substantially flat. When such bipolar plates (15) alternatingly interact with seal elements (6) that are designed flat in a fuel-cell stack (10), an effective stack seal can be achieved with low required contact pressure.

9 Claims, 6 Drawing Sheets

Figure 1:
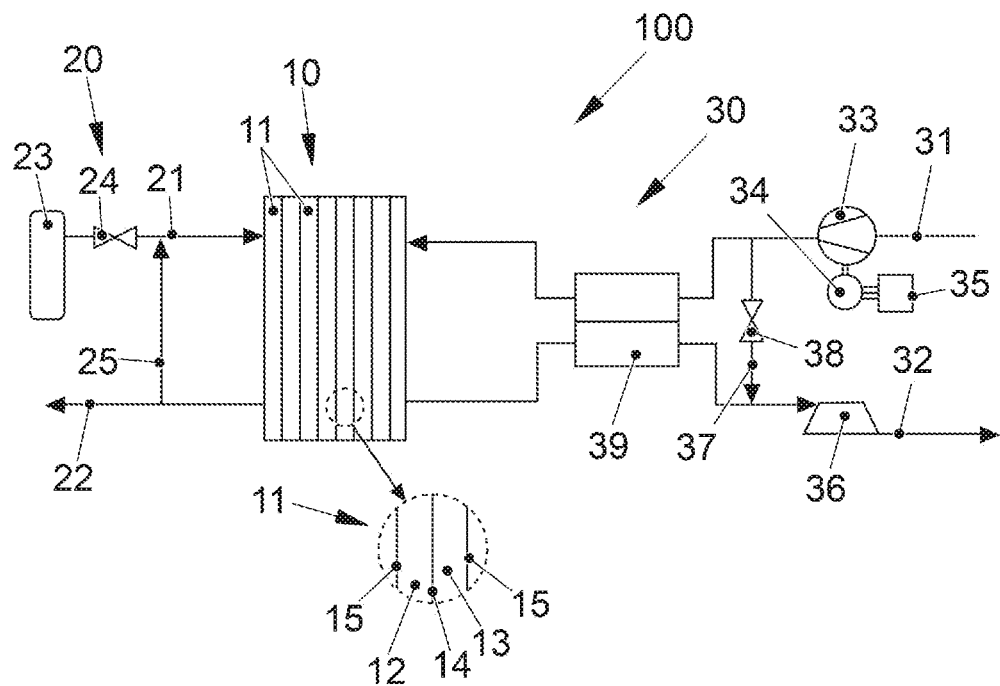

(51) Int. Cl.
*H01M 8/0273* (2016.01)
*H01M 8/0297* (2016.01)

(58) Field of Classification Search
USPC .......................................................... 429/457
See application file for complete search history.

(56) References Cited

U.S. PATENT DOCUMENTS

| | | | |
|---|---|---|---|
| 6,255,012 B1* | 7/2001 | Wilson | H01M 8/0221 |
| | | | 429/514 |
| 10,153,499 B2 | 12/2018 | Xu et al. | |
| 2004/0216832 A1* | 11/2004 | Mercuri | B32B 7/08 |
| | | | 156/219 |
| 2011/0159398 A1 | 6/2011 | Farrington et al. | |
| 2012/0122010 A1 | 5/2012 | Okabe | |
| 2013/0089809 A1* | 4/2013 | Farrington | H01M 8/0273 |
| | | | 429/492 |
| 2014/0220472 A1 | 8/2014 | Okabe | |

FOREIGN PATENT DOCUMENTS

| | | |
|---|---|---|
| CN | 101140982 A | 3/2008 |
| CN | 101499532 A | 8/2009 |
| CN | 101557002 A | 10/2009 |
| DE | 100 28 395 A1 | 12/2000 |
| DE | 698 18 874 T2 | 5/2004 |
| DE | 103 01 052 A1 | 7/2004 |
| DE | 10 2007 023 544 A1 | 11/2007 |
| DE | 102 03 174 B4 | 3/2009 |
| DE | 102 24 185 B4 | 4/2009 |
| DE | 10 2008 013 038 A1 | 9/2009 |
| JP | 2006-114227 A | 4/2006 |
| JP | 2017-063018 A | 3/2017 |
| WO | 2009/109352 A1 | 9/2009 |
| WO | 2010/030654 A1 | 3/2010 |

* cited by examiner

BIPOLAR PLATE HAVING ASYMMETRICAL SEALING SECTIONS, AND FUEL CELL STACK HAVING SUCH A BIPOLAR PLATE

The invention relates to a bipolar plate for a fuel cell stack and a fuel cell stack comprising a bipolar plate of this type.

Fuel cells use the chemical conversion of a fuel with oxygen into water in order to generate electrical energy. For this purpose, fuel cells contain the so-called membrane electrode assembly (MEA) as a core component, which is an arrangement of an ion-conducting (usually proton-conducting) membrane and of a catalytic electrode (anode and cathode), respectively arranged on both sides of the membrane. The latter generally comprise supported precious metals, in particular platinum. In addition, gas diffusion layers (GDL) can be arranged on both sides of the membrane electrode assembly, on the sides of the electrodes facing away from the membrane. Generally, the fuel cell is formed by a plurality of MEAs arranged in the stack, the electrical power outputs of which add up. Bipolar plates (also called flow field plates or separator plates), which ensure a supply of the individual cells with the operating media, i.e. the reactants, and which are usually also used for cooling, are generally arranged between the individual membrane electrode assemblies. In addition, the bipolar plates also ensure an electrically conductive contact to the membrane electrode assemblies.

During operation of the fuel cell, the fuel (anode operating medium), particularly hydrogen $H_2$ or a gas mixture containing hydrogen, is supplied to the anode via an open flow field of the bipolar plate on the anode side, where electrochemical oxidation of $H_2$ to protons $H^+$ with loss of electrons takes place ($H_2 \rightarrow 2\ H^+ + 2\ e^-$). Protons are transported (water-bound or water-free) from the anode chamber into the cathode chamber across the electrolyte or membrane that separates and electrically insulates the reaction chambers gas tight from each other. The electrons provided at the anode are guided to the cathode via an electrical line. The cathode receives, as a cathode operating medium, oxygen or a gas mixture containing oxygen (such as air) via an open flow field of the bipolar plate on the cathode side so that a reduction of $O_2$ to $O^{2-}$ with gain of electrons takes place ($\frac{1}{2}O_2 + 2\ e^- \rightarrow O^{2-}$). At the same time, the oxygen anions react in the cathode chamber with the protons transported across the membrane to form water ($O^{2-} + 2\ H^+ \rightarrow H_2O$).

A challenge in fuel cell technology is to seal fuel cell stacks fluid-tight. Frequently, seal elements are used that are alternatingly stacked with the bipolar plates and are elastically deformed when the stack is correspondingly pressed. The seal elements can be used as separate components or molded onto the bipolar plate or the membrane electrode assembly. In this context, it is known in particular to mold such a seal element like a frame around the membrane electrode assembly. The seal element is normally provided with sealing beads that sealingly interact with corresponding sealing sections of the bipolar plate (see for example FIG. 4). To this end, the sealing sections of the bipolar plate are formed with recesses into which the sealing beads engage. The thin wall thicknesses of the bipolar plate needed for these recesses nonetheless lead to a destabilization of the bipolar plate and the danger of fractures. This is in particular the case with bipolar plates that consist of carbon materials. Given the high contact pressures required with this design, the seal element can also become blocked. Finally, there is the problem of seal impairment as well as strong material stresses when a lateral offset occurs between the bipolar plate and the seal element, or between two adjacent bipolar plates, in the production of the fuel cell stack.

US 2011/0159398 A1 discloses bipolar plates with sealing projections that are arranged within a fuel cell in the area of a seal element of a membrane electrode assembly. The sealing projections are arranged on both sides of the seal and offset from each other.

JP 2006114227 A also discloses bipolar plates with sealing projections that are arranged within the area of a seal element of a membrane electrode assembly. The sealing projections are arranged on both sides of a seal and can be arranged offset or also not offset from each other.

The invention is based on the object of proposing a bipolar plate as well as a fuel cell stack that at least partially overcomes the described problems of the prior art.

This object is achieved by a bipolar plate and a fuel cell stack with a bipolar plate of this type having the features of the independent claims.

The bipolar plate according to the invention for a fuel cell stack comprises a first side on which a first flow field is formed (for transporting a first operating medium of the fuel cell), and a second side on which a second flow field is formed (for transporting a second operating medium of the fuel cell). The bipolar plate furthermore comprises a first sealing section that surrounds the first flow field, and a second sealing section that surrounds the second flow field. The sealing sections are designed to sealingly interact with a seal element in a fuel cell stack. According to the invention, at least one sealing projection is formed in the first sealing section of the bipolar plate. Furthermore, the second sealing section is formed without such a sealing projection and/or is substantially flat.

Whereas in the prior art both sealing sections arranged on both sides of the bipolar plate have sealing projections which are opposite each other or are offset from each other, according to the invention only one of the two sealing sections is formed with at least one sealing projection, whereas the second sealing section is designed substantially flat. This yields several advantages. On the one hand, this design of the bipolar plate makes it possible to use flat seal elements that are formed without sealing beads. Moreover, there is no longer the need for seal recesses in conventional bipolar plates into which the sealing beads of the elastic seal element are placed. This significantly increases the plate stability. Such an arrangement is also insensitive to a production-related lateral offset of the bipolar plates and seal element. The inventor has moreover determined that less contact pressure is required to achieve a strong sealing effect.

The aforementioned advantages are revealed in particular when, according to a preferred embodiment of the invention, the second sealing section is formed without a sealing projection and/or is substantially flat over its entire width, in particular extending up to an edge of the bipolar plate.

A sealing projection in the context of the present invention is understood to be any seal element projecting above a basic plate level that is suitable for interacting in a fuel cell stack with an elastic seal element under the effect of local compression thereupon in order to compress the seal element elastically at a point and/or locally at the contact areas between the sealing projection and the seal element. Contrastingly, being formed without a sealing projection such as the second sealing section has according to the invention means that there is no such elevation acting locally and/or at a point on the seal element. The expression "formed substantially flat" moreover means that the sealing section also does not have any recesses that, because of their dimensions, could be suitable for the elastically deformed sealing elements to penetrate into.

In an advantageous embodiment of the invention, the second sealing section is segmented by at least one groove, wherein the groove is arranged offset relative to the at least one sealing projection on the opposite side of the bipolar plate. The groove can have a dimension, in particular a groove width, that basically does not allow the penetration of the seal element deformed under the application of a contact pressure. Due to the described segmentation by grooves that in particular run parallel to the opposing sealing projections of the first sealing sections, the contact surface between the seal element and the sealing sections of the bipolar plate can be controlled and monitored. In experiments with models, it was in fact found that a stronger sealing force is achieved with less applied sealing force, or a stronger sealing force is achieved with the same applied sealing force when the second sealing section has narrower sealing surfaces.

The sealing sections of the bipolar plate formed on the two main sides of the bipolar plate have in particular a contour parallel to and close to the side edges of the bipolar plate. Accordingly, they basically peripherally surround all the surfaces of the bipolar plate in a closed form. Moreover, the sealing sections that surround the main supply openings in the bipolar plate can also be formed in the shape according to the invention, in particular in that corresponding sealing projections are formed on the first sealing section, and the opposing, second sealing section is formed without such sealing projections and/or is substantially flat.

With regard to its cross-section, the at least one sealing projection can have any shape that is suitable for acting on an elastic seal element while locally compressing it such that a seal is achieved. In particular, peaked contours, rectangular contours and polygonal contours are possible in this case, wherein however a rounded, e.g. semicircular contour or a rounded contour with a flat face is preferred since such a contour gives a comparatively large contact surface between the sealing projection and seal element with even sealing stresses and soft transitions. It is understood that the sealing projection extends in the shape of a bead over the length of the first sealing section, in particular in a closed and uninterrupted shape. The height of the at least one sealing projection by which it projects relative to a general level of the bipolar plate can largely be selected as desired in order to be selected as an optimized seal.

In a preferred embodiment of the invention, the first sealing section has two or more sealing projections that preferably run parallel to each other, for example as a double bead. By being equipped with a plurality of sealing projections, the contact surface between the bipolar plate and elastic seal element is further increased and additionally maintained in the event of a leak at a sealing projection due to the sealing effect of the other sealing projection.

In another embodiment of the invention, the first sealing section has a single sealing projection, and the second sealing section is segmented by at least one groove, wherein the at least one groove lies opposite the sealing projection in this case. In this embodiment, a sealing projection with a rounded contour with a flat face is preferred. Furthermore in this embodiment, the groove, in particular a groove width, is dimensioned such that it permits a certain penetration by the deformed seal element under the application of a contact pressure.

In one embodiment of the invention, the bipolar plate is formed from a first and a second plate that are assembled together. The first plate forms the first outer side with the first flow field and the first sealing section, and the second plate forms the second outer side with the second flow field and second sealing section. The plates can be integrally joined to each other, for example by bonded joints or weld seams, or can be releasably pressed against each other by other seal elements. Preferably, a third flow field is formed between the two plates that serves to conduct a coolant.

In the case of the bipolar plate being formed from the first and second plate, the second plate is formed with a greater plate thickness in the area of the second sealing section than outside of the second sealing section. This increases the stability of the plate relative to the pressure exerted by the sealing projections of an adjacent bipolar plate.

In one embodiment of the invention, the bipolar plate is produced from an electrically conductive carbon-based material. In particular, this can be graphite or a composite material consisting of graphite and a polymer, such as an epoxide resin. The carbon-based materials are hereinafter also referred to as carbon materials. Carbon bipolar plates have a lower specific weight and furthermore have the advantage of being producible by conventional shaping methods (such as injection molding), and possess a great flexibility of design. For example, their surface profile can be selected independently of each other on both sides. Contrastingly, metal bipolar plates are generally made of metal sheets that are profiled by pressing. A desired profile of one side of the bipolar plate thereby necessarily determines the profile on its other side. Since carbon bipolar plates have a lower fracture resistance and therefore generally require a greater wall thickness than metal bipolar plates, the advantages of the bipolar plate according to the invention are especially manifested in particular with carbon bipolar plates since the necessity of a recess for the engagement of the sealing beads of the sealing element is absent.

Another feature of the present invention relates to a fuel cell stack that has a plurality of bipolar plates which are alternatingly arranged on each other according to the present invention, as well as elastic seal elements. The fuel cell stack is distinguished in that the seal elements are formed flat, at least in the area of the sealing sections of the bipolar plates. In other words, the seal elements do not have any seal beads in the area of the sealing sections of the bipolar plates. In the case of low material stresses this embodiment enables a particularly effective sealing interaction between the bipolar plates designed according to the invention. In particular, the seal is achieved in that the at least one sealing projection of the bipolar plate acts against the flat elastic seal element, and presses and compresses it against the substantially flat contact surface of the second seal area of an adjacent bipolar plate.

For example, the elastic sealing element has a uniform thickness, at least in the area of the sealing sections, within a range of 100 to 500 μm, in particular within a range of 150 to 400 μm, and preferably within a range of 200 to 300 μm. In particular, the thickness of the seal element is chosen in dependence on the seal requirements.

Of course, beyond the bipolar plates and the seal elements, the fuel cell stack also comprises membrane electrode assemblies that are stacked alternatingly with the bipolar plates. In a preferred design of the invention, the elastic seal element is designed as part of the membrane electrode assembly, wherein it particularly preferably forms an edge area surrounding the membrane electrode assembly. The components to be stacked together can thereby be reduced, and the membrane electrode assembly can be stabilized at the same time.

Another feature of the invention relates to a fuel cell system that has a fuel cell stack according to the invention. In particular, the fuel cell system has an anode supply and a cathode supply with the corresponding peripheral components in addition to the fuel cell stack.

Another feature of the invention relates to a vehicle that has a fuel cell system with a fuel cell stack according to the invention. The vehicle is preferably an electric vehicle in which an electrical energy generated by the fuel cell system serves to supply an electric traction motor and/or a traction battery.

Additional preferred embodiments of the invention arise from the remaining features mentioned in the dependent claims.

The various embodiments of the invention mentioned in this application may be combined advantageously with one another unless stated otherwise in individual cases.

Figure 2:
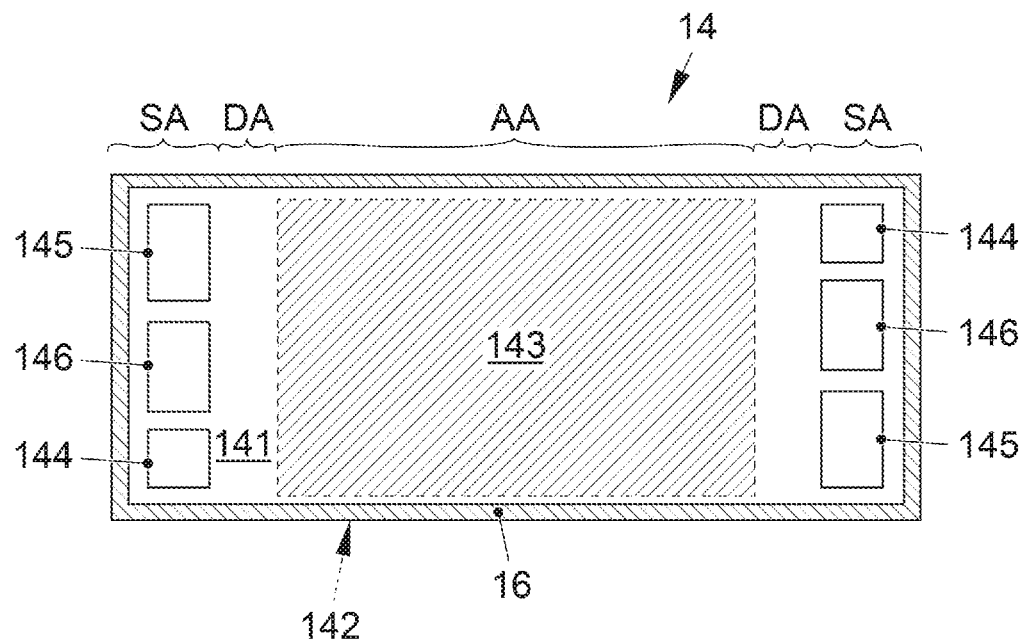
Figure 3:
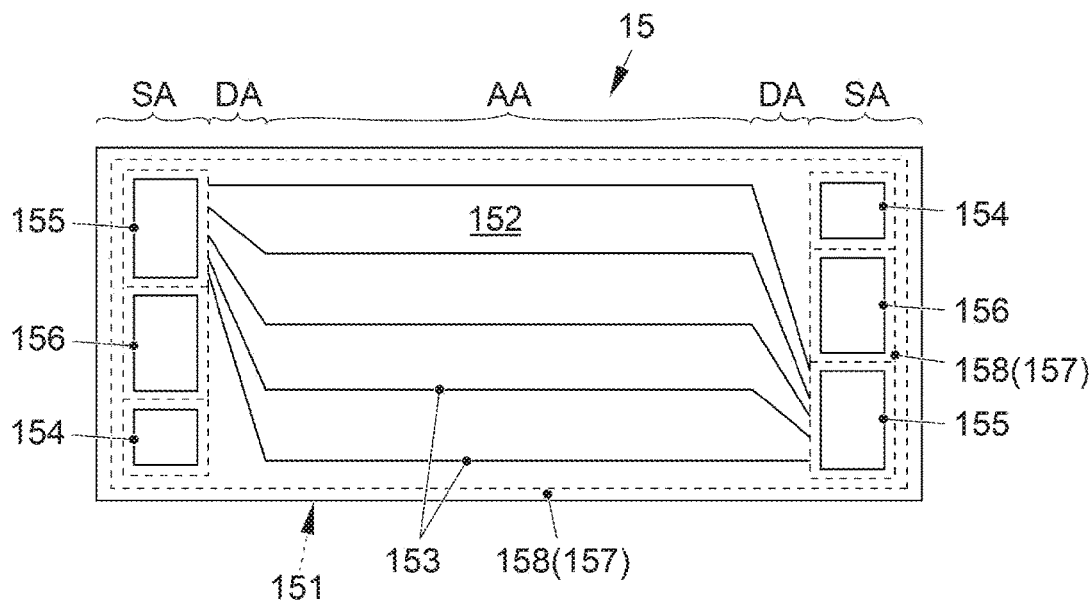
Figure 4A:
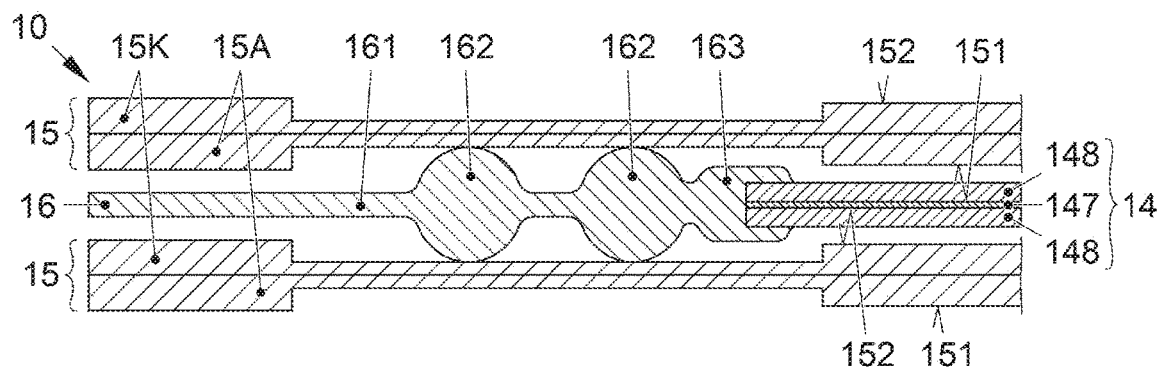
Figure 5A:
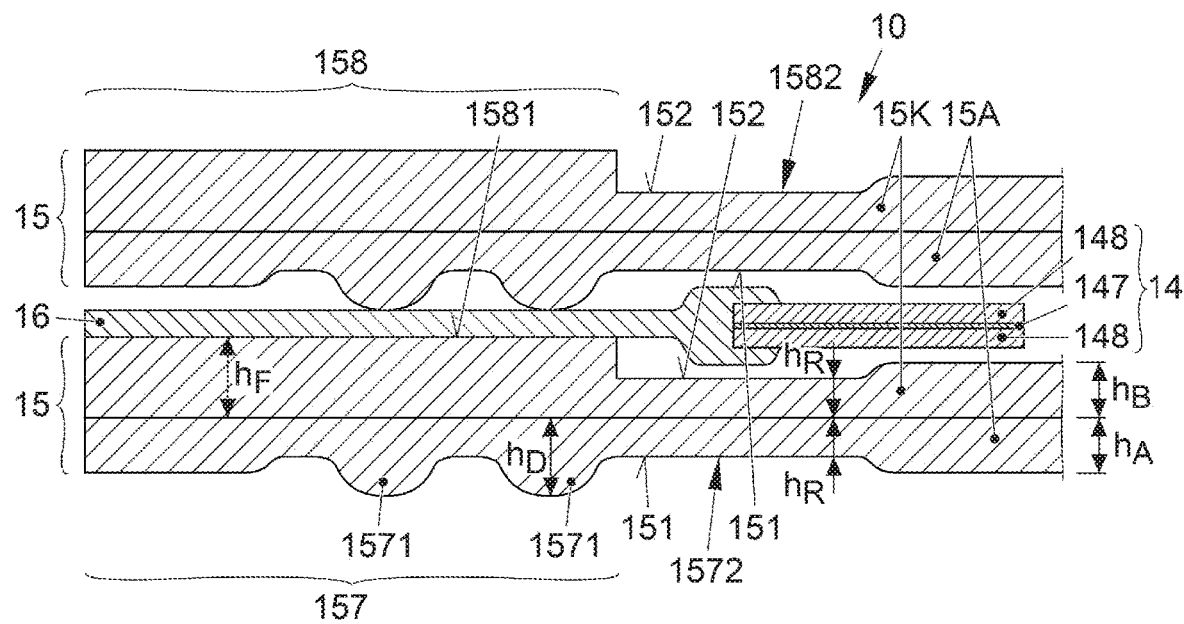
Figure 5B:
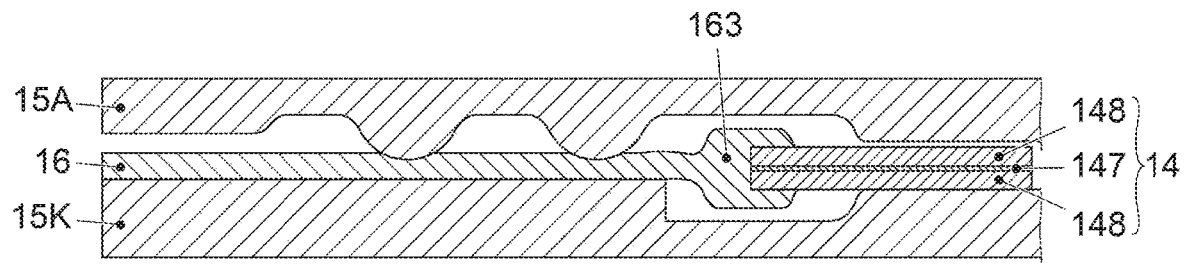
Figure 5C:
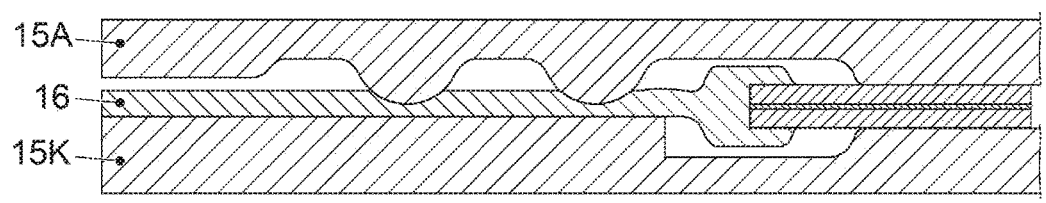
Figure 7A:
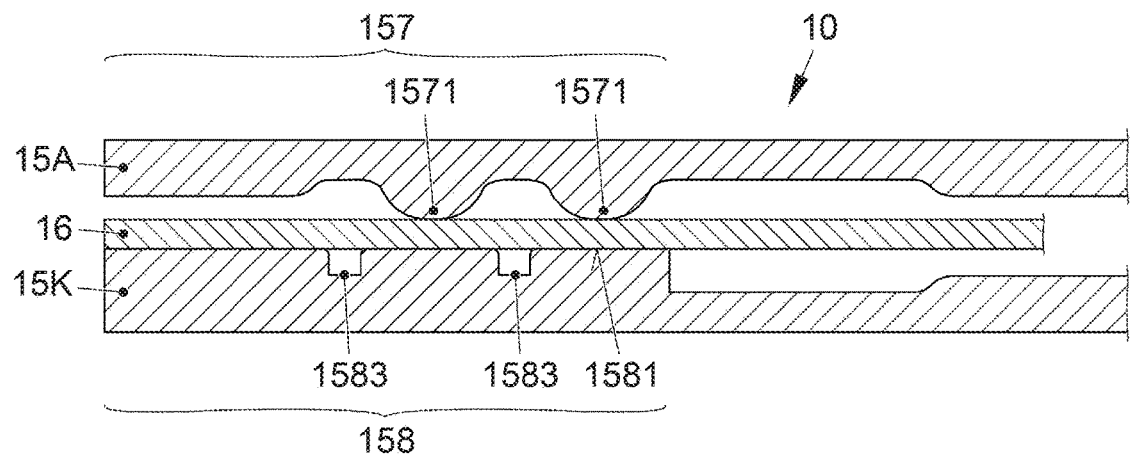
Figure 7B:
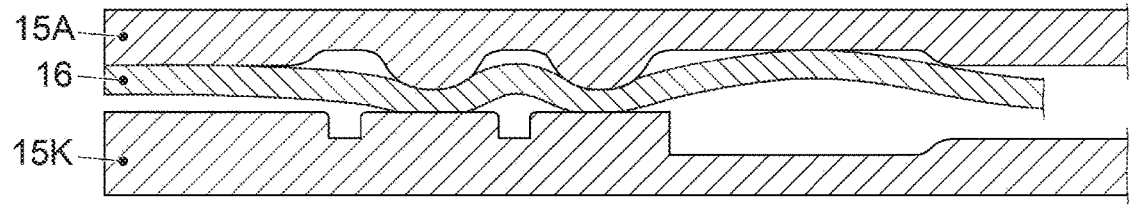
Figure 7C:
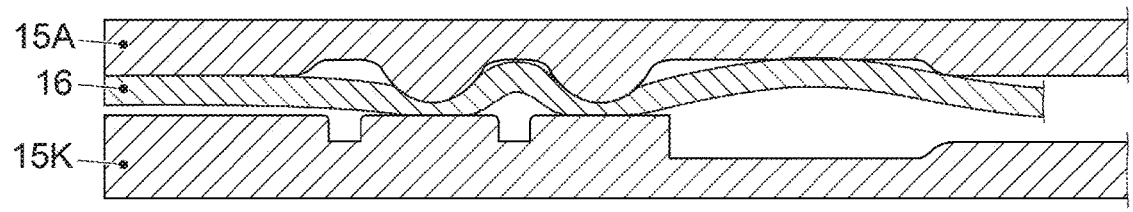

The invention is explained below in exemplary embodiments in reference to the respective drawings. The following is shown:

FIG. 1 a block diagram of a fuel cell system;

FIG. 2 a top view of a membrane electrode assembly of a fuel cell stack;

FIG. 3 a top view of a bipolar plate of a fuel cell stack;

FIG. 4 a sectional view of a fuel cell according to the prior art in the area of its edge section comprising two bipolar plates and a seal element arranged between them, (A): without compression, (B): with a seal element compressed by 41%;

FIG. 5 a sectional view of a fuel cell according to a first embodiment of the invention in the area of its edge section comprising two bipolar plates and a seal element arranged between them, (A): without compression, (B): with a seal element compressed by 42%; (C) with a seal element compressed by 50%;

FIG. 6 characteristics of different parameters as a function of the compression of the seal element of the fuel cell according to FIGS. 4 and 5, (A): sealing force, (B): sealing stress, (C) maximum tensile stress;

FIG. 7 a sectional view of a fuel cell according to a second embodiment of the invention in the area of its edge section comprising two bipolar plates and a seal element arranged between them, (A): without compression, (B): with a seal compressed by 42%; (C) with a seal compressed by 50%, and FIG. 8 a sectional view of a fuel cell according to a third embodiment of the invention in the area of its edge section comprising two bipolar plates and a seal element arranged between them, (A): without compression, (B): with a seal compressed by 50%.

FIG. 1 shows a fuel cell system, denoted overall by 100, according to a preferred embodiment of the present invention. The fuel cell system 100 is part of a vehicle (not shown), in particular an electric vehicle, which has an electric traction motor, which is supplied with electrical energy by the fuel cell system 100.

The fuel cell system 100 comprises as core components a fuel cell stack 10, which comprises a plurality of individual cells 11, which are arranged in the form of a stack and which are formed by alternately stacked membrane electrode assemblies (MEAs) 14 and bipolar plates 15 (see detailed view). Each individual cell 11 thus comprises, in each case, an MEA 14 which has an ionically conductive polymer electrolyte membrane (not shown in detail), as well as catalytic electrodes arranged on both sides, namely an anode and a cathode which catalyze the respective partial reaction of the fuel cell conversion and may in particular be designed as coatings on the membrane. The anode electrode and cathode electrode have a catalytic material, for example platinum, which is supported on an electrically conductive carrier material with a large specific surface, for example a carbon-based material. An anode space 12 is thus formed between a bipolar plate 15 and the anode, and the cathode space 13 between the cathode and the next bipolar plate 15. The bipolar plates 15 serve to supply the operating media into the anode and cathode chambers 12, 13 and also establish the electrical connection between the individual fuel cells 11. Optionally, gas diffusion layers can be arranged between the membrane electrode arrangements 14 and the bipolar plates 15.

In order to supply the fuel cell stack 10 with the operating media, the fuel cell system 100 comprises, on the one hand, an anode supply 20 and, on the other hand, a cathode supply 30.

The anode supply 20 comprises an anode supply path 21, which serves to supply an anode operating medium (fuel), for example hydrogen, to the anode chambers 12 of the fuel cell stack 10. For this purpose, the anode supply path 21 connects a fuel reservoir 23 to an anode inlet of the fuel cell stack 10. The anode supply 20 also comprises an anode exhaust path 22 which discharges the anode exhaust gas from the anode chambers 12 via an anode outlet of the fuel cell stack 10. The anode operating pressure on the anode sides 12 of the fuel cell stack 10 is adjustable via an adjusting means 24 in the anode supply path 21. The anode supply 20 may additionally have a fuel recirculation line 25 which connects the anode exhaust path 22 to the anode supply path 21, as shown. The recirculation of fuel is customary in order to return the mostly over-stoichiometrically supplied fuel to the stack and to use it.

The cathode supply 30 comprises a cathode supply path 31 which supplies an oxygen-containing cathode operating medium to the cathode chambers 13 of the fuel cell stack 10, in particular air which is sucked in from the environment. The cathode supply 30 also comprises a cathode exhaust path 32, which discharges the cathode exhaust gas (in particular the exhaust air) from the cathode chambers 13 of the fuel cell stack 10 and supplies it, if appropriate, to an exhaust system (not shown). A compressor 33 is arranged in the cathode supply path 31 for conveying and compressing the cathode operating medium. In the embodiment shown, the compressor 33 is designed as a compressor which is driven mainly by an electric motor, the drive of said compressor being effected via an electric motor 34 equipped with a corresponding power electronics system 35. The compressor 33 may also be driven by a turbine 36 (optionally with variable turbine geometry) disposed in the cathode exhaust path 32 via a common shaft (not shown).

In accordance with the illustrated embodiment, the cathode supply 30 can also have a wastegate line 37 which connects the cathode supply line 31 to the cathode exhaust line 32, i.e., represents a bypass of the fuel cell stack 10. The wastegate line 37 allows excess air mass flow past the fuel cell stack 10 without driving down the compressor 33. An actuating means 38 arranged in the wastegate line 37 serves to control the amount of the cathode operating medium bypassing the fuel cell stack 10. All actuating means 24, 26, 38 of the fuel cell system 100 may be designed as controllable or non-controllable valves or flaps. Corresponding additional actuating means may be arranged in the lines 21, 22, 31 and 32 in order to be able to isolate the fuel cell stack 10 from the environment.

The fuel cell system 100 can furthermore have a humidifier module 39. The humidifier module 39 is arranged in the cathode supply path 31 on the one hand so that the cathode operating gas can flow through it. On the other hand, it is arranged in the cathode exhaust path 32 such that the cathode exhaust gas can flow through it. The humidifier 39 typically has a plurality of membranes permeable by water vapor which are designed to be either flat or in the form of hollow fibers. In this case, the comparatively dry cathode operating gas (air) flows over one side of the membranes and the comparatively moist cathode exhaust gas (exhaust gas) flows over the other side. Driven by the higher partial pressure of the water vapor in the cathode exhaust gas, water vapors pass over the membrane into the cathode operating gas, which is humidified in this way.

Various further details of the anode and cathode supply 20, 30 are not shown in the simplified FIG. 1 for reasons of clarity. For example, a water separator can be installed in the anode and/or cathode exhaust path 22, 32 in order to condense and drain product water arising from the fuel cell reaction. Finally, the anode exhaust gas line 22 can merge into the cathode exhaust gas line 32 so that the anode exhaust gas and the cathode exhaust gas are discharged via a common exhaust gas system.

FIGS. 2 and 3 each show a plan view of an example of a membrane electrode assembly 14 and bipolar plate 15 according to the invention.

Both components are divided into an active area AA, supply areas SA and distribution areas DA. The active area AA is characterized in that the fuel cell reactions take place in this area. To this end, the membrane electrode assembly 14 has a catalytic electrode 143 in the active area AA on both sides of the polymer electrode membrane 14. Supply openings 144, 145, 146 are arranged within the supply areas SA on the side of the membrane electrode assembly 14, and 154, 155, 156 on the side of the bipolar plate that, in a stacked state, are substantially flush with each other and form supply channels that penetrate the fuel cell stack 10 over its entire stack height. The anode inlet and outlet openings 144 and 145 serve to supply the anode operating gas, i.e., the fuel, such as hydrogen, as well as to remove the anode exhaust gas after overflowing the active area AA. The cathode inlet and outlet openings 145 and 145 serve to supply the cathode operating gas, which in particular is oxygen or an oxygen-containing mixture, preferably air, as well as to remove the cathode exhaust gas after overflowing the active area AA. The coolant inlet and outlet openings 146 and 156 serve to supply and drain the coolant.

The MEA 14 comprises an anode side 141 that can be seen in FIG. 2. The illustrated catalytic electrode 143 is thus formed as an anode, for example as a coating on the polymer electrolyte membrane. The cathode side 142, which is not visible in FIG. 2, has a corresponding catalytic electrode 36, in this case the cathode. The polymer electrolyte membrane can extend over the entire expanse of the membrane electrode assembly 14, at least however over the central active area AA. In the other areas SA and DA, a reinforcing support film can be arranged that encloses and encompasses the membrane and active area AA on both sides like a frame. At least in the outer edge area (hatched area), the membrane electrode assembly 14 is furthermore surrounded by an elastic seal element 16 like a frame that is formed from an elastic polymer material such as silicone or the like. The elastic seal element 16 can be integrally bonded with the membrane electrode assembly 14 such that it is a component thereof.

The bipolar plate 15 represented in FIG. 3 has a second side which is visible in the representation, in this case the cathode side 152, as well as a covered first side, the anode side 151 in this case. In typical embodiments, the bipolar plate 15 is composed of two joined plate halves, the anode plate and the cathode plate. On the illustrated cathode side 152, operating medium channels 153 are formed as open, trough-like channel structures that connect the cathode inlet opening 155 to the cathode outlet opening 155 and that form a second flow field, in this case the cathode flow field for conducting the cathode operating medium. Only five exemplary operating medium channels 153 are shown, wherein a substantially higher number is generally provided. Likewise, the anode side 151 which is not visible in this case has corresponding operating medium channels that connect the anode inlet opening 154 to the anode outlet opening 154 and form a first flow field, in this case the anode flow field for conducting the anode operating medium. These operating medium channels for the anode operating medium are also typically designed as open, trough-like, channel structures. Enclosed coolant channels run within the interior of the bipolar plate 15, in particular between the two plate halves, and connect the coolant inlet opening 156 to the coolant outlet opening 156.

A second sealing section 158 is formed in the surrounding edge area of the visible second cathode side 152 of the bipolar plate 15 which sealingly interacts in the assembled fuel cell stack 10 with the seal element 16 of the cathode side 142 of the membrane electrode assembly 14. At the same time, a first sealing section 157 is formed in the surrounding edge area of the bipolar plate 15 of the covered first anode side 151 which sealingly interacts in the fuel cell stack 10 with the seal element 16 of the anode side 141 of the membrane electrode assembly 14. The edge of the sealing sections 158, 157 is represented in FIG. 3 by the broken lines. As is illustrated, the supply openings 154, 156, 156 on both sides of the bipolar plate 15 can also each be surrounded by corresponding first and second sealing sections 157, 158.

The design of the sealing sections according to the prior art and according to embodiments of the invention is illustrated in the following FIGS. with the aid of sections at the edge area of a fuel cell.

FIG. 4 shows an individual cell of a fuel cell stack 10 according to the prior art in a sectional view at the edge area of the cell, i.e., at the edge area of the bipolar plates 15. A membrane electrode assembly 14 is shown onto which a seal element 16 is molded at the edge. The membrane electrode assembly 16 with the seal element 16 is arranged between two bipolar plates 15. The membrane electrode assembly 14 comprises a laminate 147 consisting of a polymer electrolyte membrane, as well as two catalytic electrodes coated on both sides (not shown in detail), i.e., an anode and a cathode. A gas diffusion layer 148 is arranged on both sides of the laminate 147.

The elastic seal element 16 has a flat planar main body 161 as well as two sealing beads 162. The connection to the membrane electrode assembly 14 is formed by a connecting section 163 designed like a flange that encloses the edge area of the MEA 14 on both sides.

The bipolar plates 15 are each composed of two half-plates, i.e., a first half-plate 15A (anode plate), as well as the second half-plate 15K (cathode plate). In the sealing section of the bipolar plates 15 illustrated in FIG. 4, these each have a recess both on their anode side 151 as well as on their cathode side 152 in which lie the sealing beads 162 of the seal element 16. A typical diameter of a sealing bead 162 measured from its lowest to its highest point lies within the order of magnitude of 1 to 3 mm, in the shown example 1.1 mm, whereas a typical width of the recesses of the bipolar plate 15 lies within a range of 3-10 mm, in this case 5.2 mm.

Figure 4B:
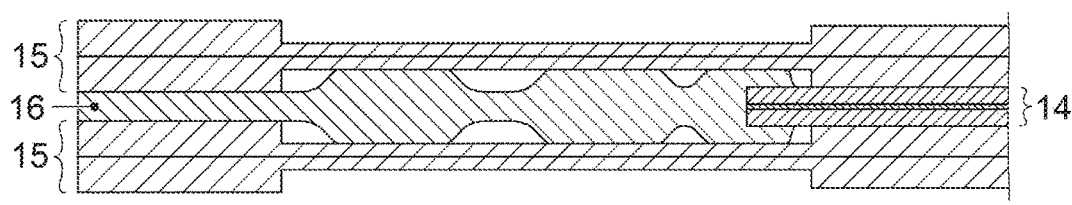

After a compressive force is applied, elastic compression of the sealing beads 162 occurs as shown in FIG. 4B so that the contact surface of the bipolar plates comes into contact with the main body 161 of the seal element 116, or with the membrane electrode assembly 114. In the illustrated example, this is the case with a 41% degree of compression of the sealing beads 162. Comparatively high contact pressure is required for this. Furthermore the disadvantage with the design shown in FIG. 4 is that the wall thicknesses of the bipolar plate 15 or their half-plates 15A, 15K are thin in the area of the recesses in the shown sealing sections, and instability and fractures can therefore occur in this area. It is furthermore problematic that impairment of the sealing effect can occur due to production-related lateral shifts in the bipolar plates 15 relative to the seal element 16, i.e., when the sealing beads 162 come into contact with the edges of the recesses. Moreover, this situation leads to stresses in the seal element 16 and reduces its life. In the event of a frequently occurring overcompression, the danger exists of the seal being blocked. Finally, the illustrated design requires the connecting section 163 in order to create the connection with the MEA 14.

To solve these problems, a bipolar plate 15 according to the present invention as illustrated in FIG. 5 has an asymmetrical design of its sealing sections 157, 158. In the following figures, the same reference numbers as used in FIG. 4 are used for the same elements.

According to the invention, the first sealing section 157 that is formed on the first side 151 of the anode plate has at least one, in the illustrated example two, sealing projections 1571. The sealing projections 1571 are distinguished in that their height $h_D$ is greater than a base height $h_A$ of the anode plate 15A, such that the sealing projections 1571 protrude in comparison to the base height $h_A$ of the anode plate 15A. In contrast, the second sealing section 158 which is formed on the cathode side 152 of the cathode plate 15K is without such a sealing projection and has a substantially flat contact surface 1581. This flat contact surface 1581, formed free of sealing projections, of the second sealing section 158 preferably extends to the edge of the bipolar plate 15 (on the left in the figure). In the illustrated embodiment, the plate thickness $h_F$ of the second half-plate 15K is greater in the area of the second sealing section 158 than the basic thickness $h_B$ of the half-plate 15K outside of the second sealing section 158. This produces an improved stability in this area.

As shown in FIG. 5, the sealing projections 1571 can furthermore be arranged in a sunken section 1572 of the first half-plate 15A. The second section 1572 has a plate thickness $h_R$ that is less than the basic plate thickness $h_A$ of the first half-plate 15A. At the same time, it can be provided that the elevated contact surface 1581 of the second sealing section 158 is arranged within a sunken section 1582 of the second half-plate 15K.

The embodiment of the bipolar plate 15 according to the invention manifests its best sealing effect when it is used in combination with a seal element 16 that is formed flat, at least in the area of the sealing sections 157, 158 of the bipolar plates 15 as shown in FIG. 5. In other words, such a seal element 16 has a uniform thickness of for example 250 μm, at least in this edge area.

FIGS. 5B and C show the fuel cell 10 from FIG. 5A in a state in which the seal element 16 is compressed by a degree of compression of 42% or 50% in the area of the sealing projections 1571 under the effect of a corresponding contact pressure. Only the anode plate 15A of the top bipolar plate and the cathode plate 15K of the bottom bipolar plate are represented in FIGS. B and C. Unlike the conventional design according to FIG. 4, it can be seen that no pressure acts on the connecting section 163 to the MEA 14 in the design according to the invention. Within the context of the invention, it is therefore also possible to omit an arched connecting section 163 and to select another shape for the connection to the MEA 14.

Figure 6A:
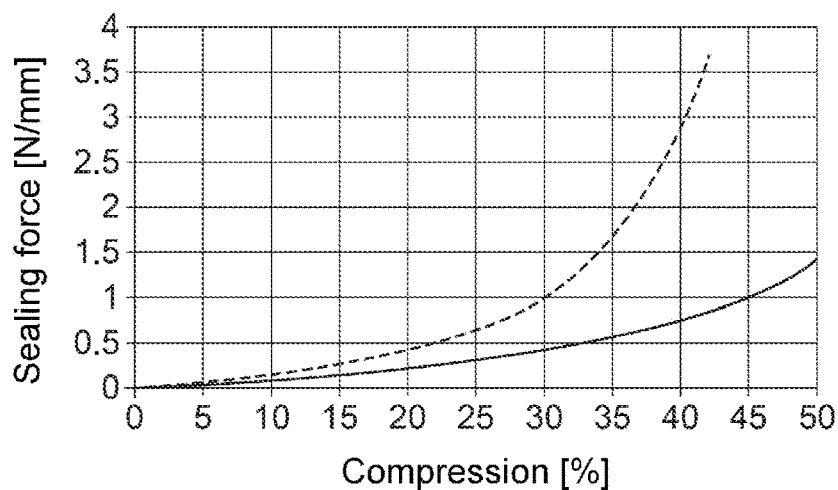

In a computer simulation, different physical parameters were determined depending on the compression of the respective seal element 16 for the fuel cells 10 illustrated in FIGS. 4 and 5. The curves represented as a dashed line each show the characteristics of the fuel cell 10 shown in FIG. 4 according to the prior art, and the solid curve shows the characteristics of the fuel cell 10 according to the invention illustrated in FIG. 5. FIG. 6A shows the sealing force that must be applied to achieve specific degrees of compression of the seal element 16. It can be seen that the sealing force to be applied is significantly lower over the entire characteristic for the fuel cell 10 according to the invention than for the conventional fuel cell. In order for example to obtain a degree of compression of 40% of the uncompressed seal element 16, a force of only approximately 0.75 N/mm must be applied in the design according to the invention, whereas a force of nearly 0.75 N/mm is needed in a conventional fuel cell for the same compression. Moreover, the maximum compression of the conventional fuel cell is limited to approximately 42% (see FIG. 4B).

Figure 6B:
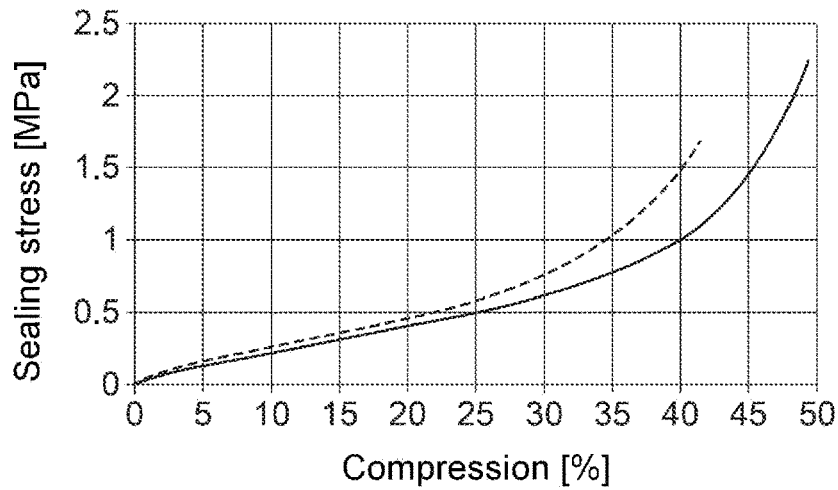

FIG. 6B shows the characteristic of the achieved seal tension as a function of the degree of compression. In this simulation, the achieved seal stress or sealing force of the fuel cell according to the invention is only slightly below the achieved seal stress of the conventional cell. The sealing stress is a measure of the achieved tightness of the fuel cell. For example a degree of compression of just 35% corresponding to a sealing force of 1.7 N/mm is needed in a conventional design to achieve a sealing stress of 1 MPa. Contrastingly, the cell according to the invention requires a degree of compression of nearly 40% for the same sealing stress of 1 MPa which however can be achieved with a significantly lower sealing force of 0.75 N/mm. It is anticipated that by further optimizing the sealing projections and the thickness of the seal element 16, a sealing stress can be obtained that is at least as great as that in the conventional design.

Figure 6C:
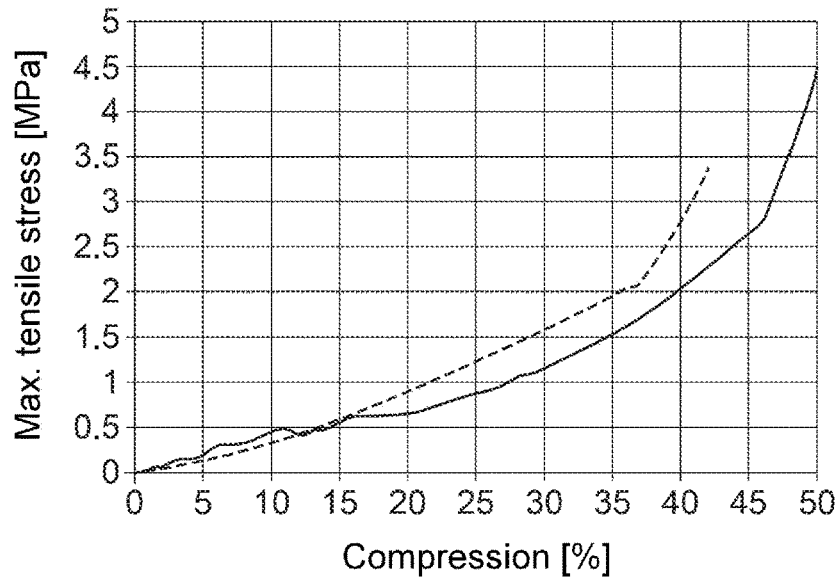

FIG. 6C shows the characteristics of the maximum tensile stress in the material of the seal element 16 as a function of compression. It can be seen that the maximum tensile stress in the design according to the invention is less than in the conventional cell. Accordingly an extended life of the seal element 16 is anticipated for the design according to the invention.

The same simulations were performed for the fuel cell according to the invention when the anode plate 15A is arranged offset by 250 μm to the right of the cathode plate 15K according to the illustration in FIG. 5. As anticipated, this had practically no effects on the results (not shown).

FIG. 7 shows a fuel cell 10 according to the invention according to a second embodiment of the invention (representation of the MEA 14 was omitted here). Only the anode plate 15A of the top bipolar plate and the cathode plate 15K of the bottom bipolar plate 15 are illustrated. In contrast to the embodiment shown in FIG. 5, the design according to FIG. 7 differs in that the contact surface 1581 of the sealing section 158 of the cathode plate 15K has grooves 1583 that segment the contact surface 1581. The grooves 1583 in this case are arranged offset from the sealing projections 1571 of the anode plate 15A such that the grooves 1583 and the sealing projections 1571 do not face each other. Furthermore, the grooves 1583 have a dimension, in particular a width, that prevents the sealing element 16 from penetrating the grooves 1583. The formation of the contact surface 1581 of the cathode plate 15K in the sealing section 158 makes it possible to control the contact surface between the seal element 16 and the plates 15A and 15K. FIGS. 7A and B in turn show the deformation of the seal element 16 with a degree of compression of 42% and 50% respectively.

Figure 8A:
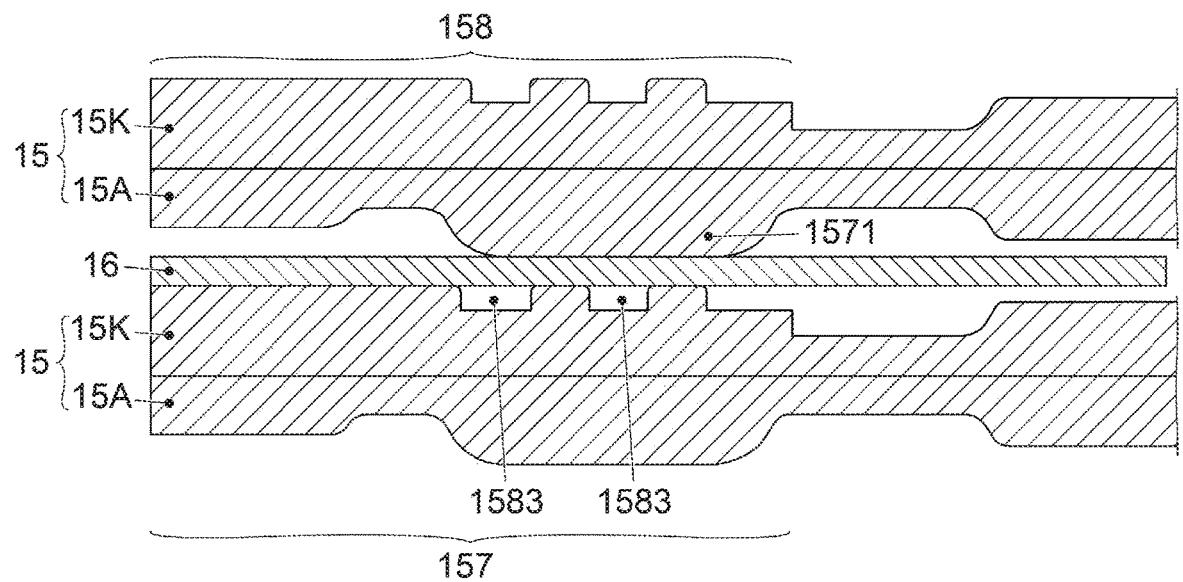
Figure 8B:
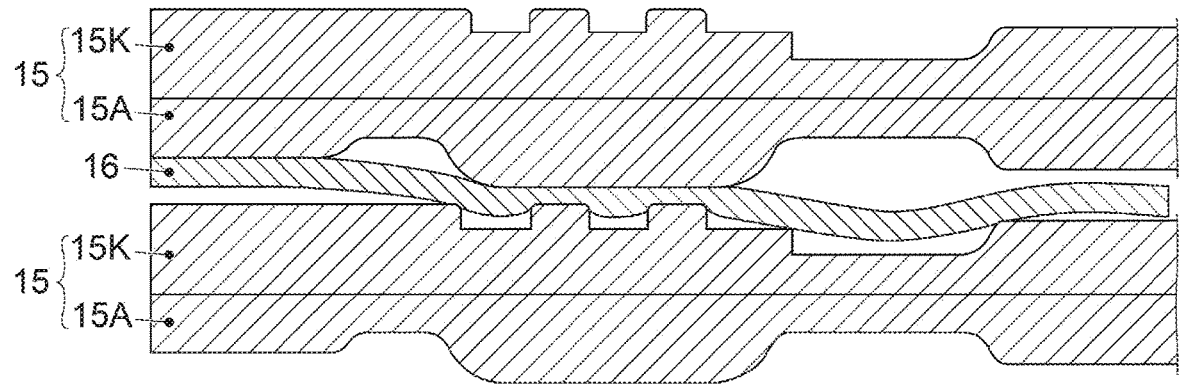

Another development of a fuel cell 10 according to the invention is shown in FIG. 8, wherein FIG. 8A shows the uncompressed state, and FIG. 8B shows the fuel cell 10 with a 50% degree of compression of the seal element 16. The MEA 14 has not been illustrated here. In this example, the sealing section 157 of the anode plate 15A only has a single, relatively wide sealing projection 1571 that possesses a rounded contour with a flat face. The opposite sealing section 158 of the cathode plate 15K is segmented here by two grooves 1583, the width of which is selected larger than in FIG. 7. Moreover, the grooves 1583 are arranged such that they face the sealing projection 1571 of the anode plate 15A. As can be seen in FIG. 8B, the seal element 16 is partially pressed into the grooves 1583 when a contact pressure is applied.

LIST OF REFERENCE SYMBOLS

100 Fuel cell system
10 Fuel cell stack
11 Individual cell
12 Anode chamber
13 Cathode chamber
14 Membrane electrode assembly (MEA)
141 Anode side
142 Cathode side
143 Catalytic electrode/anode
144 Supply opening/anode inlet opening or anode outlet opening
145 Supply opening/cathode inlet opening or cathode outlet opening
146 Supply opening/coolant inlet opening or coolant outlet opening
147 Laminate consisting of polymer electrolyte membrane and catalytic electrodes
148 Gas diffusion layer
15 Bipolar plate (separator plate, flow field plate)
15A First half-plate/anode plate
15K Second half-plate/cathode plate
151 First side/anode side
152 Second side/cathode side
153 Operating medium channel/anode channel or cathode channel/first or second flow field
154 Supply opening/anode inlet opening or anode outlet opening
155 Supply opening/cathode inlet opening or cathode outlet opening
156 Supply opening/coolant inlet opening or coolant outlet opening
157 First sealing section
1571 Seal projection
1572 Sunken section
158 Second sealing section
1581 Contact surface
1582 Sunken section
16 Sealing element
161 Main body
162 Sealing bead
163 Connecting section
20 Anode supply
21 Anode supply path
22 Anode exhaust path
23 Fuel tank
24 Actuating means
25 Fuel recirculation line
30 Cathode supply
31 Cathode supply path
32 Cathode exhaust path
33 Compressor
34 Electric motor
35 Power electronics
36 Turbine
37 Wastegate line
38 Actuating means
39 Humidifier module
AA Active area (reaction area)
SA Supply area
DA Distribution area
$h_A$ Basic thickness of the first half-plate/anode plate
$h_K$ Basic thickness of the second half-plate/cathode plate
$h_D$ Height of the sealing projection
$h_R$ Wall thickness in the sunken section
$h_F$ Wall thickness of the contact surface

The invention claimed is:

1. A bipolar plate for a fuel cell stack, comprising:
an anode half-plate on which an anode flow field is formed, and a cathode half-plate on which a cathode flow field is formed; and
a first elastic seal and a second elastic seal;
wherein the anode half-plate includes an anode sealing section of the anode half-plate that surrounds the anode flow field;
wherein the cathode half-plate includes a cathode sealing section of the cathode half-plate that surrounds the cathode flow field;
wherein the anode sealing section of the anode half-plate is in direct contact with the first elastic seal and the cathode sealing section of the cathode half-plate is in direct contact with the second elastic seal;
wherein the anode sealing section of the anode half-plate includes one or more sealing projections having a first height greater than the rest of the anode half-plate of the bipolar plate;
wherein the cathode sealing section of the cathode half-plate is formed without a sealing projection, and includes a substantially flat contact surface that has a second height greater than the rest of the cathode half-plate of the bipolar plate; and
wherein the substantially flat contact surface of the cathode sealing section of the cathode half-plate is directly opposite the one or more sealing projections of the anode sealing section of the anode half-plate.

2. The bipolar plate according claim 1, wherein the cathode sealing section is substantially flat over an entire width of the cathode sealing section.

3. The bipolar plate according to claim 1, wherein the at least one sealing projection of the anode sealing section has a cross-section with a rounded contour, or a rounded contour with a flat face.

4. The bipolar plate according to claim 1, wherein the bipolar plate is made of an electrically conductive carbon-based material.

5. A fuel cell stack, comprising:
a plurality of bipolar plates alternatingly arranged on each other; and
elastic seal elements;
wherein each of the bipolar plates includes:
an anode half-plate on which an anode flow field is formed, and a cathode half-plate on which a cathode flow field is formed;
wherein the anode half-plate includes an anode sealing section of the anode half-plate that surrounds the anode flow field;
wherein the cathode half-plate includes a cathode sealing section of the cathode half-plate that surrounds the cathode flow field;
wherein the anode sealing section of the anode half-plate is in direct contact with a first one of the elastic seal elements and the cathode sealing section of the cathode half-plate is in direct contact with a second one of the elastic seal elements;
wherein the anode sealing section of the anode half-plate includes one or more sealing projections having a first height greater than the rest of the anode half-plate of the bipolar plate;
wherein the cathode sealing section of the cathode half-plate is formed without a sealing projection and includes a substantially flat contact surface that has a second height greater than the rest of the cathode half-plate of the bipolar plate;
wherein the substantially flat contact surface of the cathode sealing section of the cathode half-plate is directly opposite the one or more sealing projections of the anode sealing section of the anode half-plate; and
wherein the seal elements are designed flat, at least in the area of the anode and cathode sealing sections of the anode and cathode half-plates of the bipolar plates.

6. The fuel cell stack according to claim 5, wherein the elastic seal elements have a uniform thickness within a range of 100 μm to 500 μm.

7. The fuel cell stack according to claim 5, wherein the elastic seal elements are part of the membrane electrode assembly.

8. The bipolar plate according to claim 1, wherein:
the anode sealing section of the anode half-plate includes a plurality of sealing projections that collectively extend over a lateral area of the anode sealing section of the anode half-plate; and
the substantially flat contact surface of the cathode sealing section of the cathode half-plate is directly opposite the plurality of sealing projections of the anode sealing section of the anode half-plate.

9. The fuel cell stack according to claim 5, wherein:
the anode sealing section of the anode half-plate includes a plurality of sealing projections that collectively extend over a lateral area of the anode sealing section of the anode half-plate; and
the substantially flat contact surface of the cathode sealing section of the cathode half-plate is directly opposite the plurality of sealing projections of the anode sealing section of the anode half-plate.

* * * * *